United States Patent
Pance et al.

(10) Patent No.: US 9,395,817 B2
(45) Date of Patent: Jul. 19, 2016

(54) METHOD AND APPARATUS FOR LOCALIZATION OF HAPTIC FEEDBACK

(71) Applicant: Apple Inc., Cupertino, CA (US)

(72) Inventors: Aleksandar Pance, Saratoga, CA (US); Paul Alioshin, Palo Alto, CA (US); Brett Bilbrey, Cupertino, CA (US); David Thomas Amm, Sisters, OR (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/546,700

(22) Filed: Nov. 18, 2014

(65) Prior Publication Data

US 2015/0077373 A1    Mar. 19, 2015

Related U.S. Application Data

(63) Continuation of application No. 13/770,863, filed on Feb. 19, 2013, now Pat. No. 8,890,668, which is a continuation of application No. 12/504,821, filed on Jul. 17, 2009, now Pat. No. 8,378,797.

(51) Int. Cl.
| | |
|---|---|
| *H04B 3/36* | (2006.01) |
| *G06F 3/01* | (2006.01) |
| *G06F 3/0488* | (2013.01) |
| *G08B 6/00* | (2006.01) |
| *G06F 3/041* | (2006.01) |

(52) U.S. Cl.
CPC ............... *G06F 3/016* (2013.01); *G06F 3/041* (2013.01); *G06F 3/04886* (2013.01); *G08B 6/00* (2013.01)

(58) Field of Classification Search
CPC .................................. G06F 3/016; G08B 6/00
USPC ............... 340/407.1, 407.2; 345/156, 173; 715/701, 702; 463/30
See application file for complete search history.

(56) References Cited

U.S. PATENT DOCUMENTS

| | | | |
|---|---|---|---|
| 6,429,846 B2 | 8/2002 | Rosenberg et al. | |
| 6,693,622 B1 | 2/2004 | Shahoian et al. | |

(Continued)

FOREIGN PATENT DOCUMENTS

| | | |
|---|---|---|
| CN | 101636105 | 9/2007 |
| EP | 0823108 | 4/2004 |

(Continued)

*Primary Examiner* — Toan N Pham

(74) *Attorney, Agent, or Firm* — Brownstein Hyatt Farber Schreck, LLP

(57) ABSTRACT

In an embodiment, a haptic feedback system includes a plurality of actuators to provide tactile feedback associated with an input surface. Each actuator is adapted to be activated independently of the other actuators. The system further includes a controller to activate a first actuator of the plurality of actuators to induce a first vibration at a selected input location of the input surface and to activate one or more additional actuators to induce at least a second vibration to localize the first vibration at the selected input location.

20 Claims, 5 Drawing Sheets

(56) References Cited

U.S. PATENT DOCUMENTS

| | | |
|---|---|---|
| 7,106,305 B2 | 9/2006 | Rosenberg |
| 7,324,094 B2 | 1/2008 | Moilanen et al. |
| 8,378,797 B2 | 2/2013 | Pance et al. |
| 8,493,364 B2 | 7/2013 | Charlier et al. |
| 8,890,668 B2 | 11/2014 | Pance et al. |
| 2004/0178996 A1 | 9/2004 | Kurashima et al. |
| 2007/0002029 A1 | 1/2007 | Iso |
| 2008/0068334 A1 | 3/2008 | Olien et al. |
| 2008/0163051 A1 | 7/2008 | Olien |
| 2009/0002328 A1 | 1/2009 | Ulrich et al. |
| 2009/0167704 A1 | 7/2009 | Terlizzi et al. |
| 2010/0079264 A1* | 4/2010 | Hoellwarth ........... 340/407.2 |
| 2010/0156818 A1 | 6/2010 | Burrough et al. |

FOREIGN PATENT DOCUMENTS

| | | |
|---|---|---|
| WO | WO 2008/037275 | 4/2008 |
| WO | WO 2011/008292 | 1/2011 |

* cited by examiner

METHOD AND APPARATUS FOR LOCALIZATION OF HAPTIC FEEDBACK

This application is a continuation of U.S. patent application Ser. No. 13/770,863, entitled "METHOD AND APPARATUS FOR LOCALIZATION OF HAPTIC FEEDBACK," filed on Feb. 19, 2013, now U.S. Pat. No. 8,890,668, which is a continuation of U.S. patent application Ser. No. 12/504,821, entitled "METHOD AND APPARATUS FOR LOCALIZATION OF HAPTIC FEEDBACK, filed on Jul. 17, 2009, now U.S. Pat. No. 8,378,797, both of which are incorporated by reference as if fully disclosed herein.

BACKGROUND

The present disclosure relates generally to methods and apparatus for providing haptic feedback, and more particularly relates to methods and apparatus for localizing of haptic feedback by limiting the effects of vibratory crosstalk between feedback positions.

The term "haptic" refers to touch or tactile sensation, and the term "haptic feedback system" refers to a system configured to provide a selective tactile feedback sensation (such as a vibration or other physical sensation, etc.) at a contact location of a surface in response to contact of a user at that location. Such haptic feedback systems include an input surface and one or more actuators (such as piezoelectric transducers, electromechanical devices, and/or other vibration inducing devices) that are mechanically connected to the back of the input surface. Drive electronics coupled to the one or more actuators cause the actuators to induce a selected vibratory response into the surface to which they are attached, thereby providing a tactile sensation to a user.

Many conventional devices, such as touch screen interfaces, have multiple feedback locations provided on a single surface, where typically each contact location will correspond to a user input location. With many such touch screen devices, a single actuator vibrates the entire surface relative to input at any one of several locations on the surface. Such devices offer essentially no localization of the haptic feedback. However, devices have been proposed where multiple actuators are distributed along the surface, each at a separate contact location, to provide some localization to the user feedback. However, because there are multiple actuator inputs into a single surface, the vibration can propagate to other locations, thus limiting the ultimate localization effect.

The problem of propagating tactile sensations from the selected input location to other locations across the input surface (sometimes referred to as "vibratory crosstalk" or "tactile crosstalk") can be especially pronounced in multi-touch systems, such as a virtual keyboard or keypad, a multi-touch track pad, or a touch screen interface, having multiple contact locations. In such systems, the number of actuators can be increased to improve the granularity of the tactile sensation; however, such systems typically still suffer from undesired vibratory crosstalk.

Accordingly, embodiments of haptic feedback systems and methods are disclosed below that provide new methods and apparatus providing improved localization of haptic feedback provided through an input surface.

SUMMARY

Haptic feedback methods and apparatus are disclosed that use a plurality of individually actuable actuators coupled to an input surface to induce vibrations into the surface, both to provide feedback vibratory response to a user, and also to assist in localizing that feedback vibratory response to the user input location. In response to a user selection at an input location, the system will generate a first feedback signal configured to provide a desired vibratory response to a user. The system will also induce vibrations at one or more other locations to suppress vibratory crosstalk resulting from at least the initial feedback signal. This suppression may range from changing the perceivable vibration response an another location to mask or otherwise obscuring the propagating vibratory crosstalk, to general cancellation (to at least some degree) of such vibratory crosstalk, such as through destructive interference. In some examples, the system includes a controller configured to activate a first actuator of the plurality of actuators to induce the described tactile feedback vibration at a selected contact location of the input surface, and further configured to activate one or more additional actuators to induce a suppression waveform vibration to assist in localizing the first vibration at the selected input location.

DETAILED DESCRIPTION

The following detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure.

Thus, the present invention includes a variety of combinations and/or integrations of the embodiments and examples described herein, as well as further embodiments and examples as defined within the scope of all claims based on this disclosure, as well as all legal equivalents of such claims.

For the purposes of this specification, a "computing system," a "processor-based system" or "processing system" includes a system that uses one or more processors, microcontrollers and/or digital signal processors and that has the capability of running a "program." As used herein, the term "program" refers to a set of executable machine code instructions, and as used herein, includes user-level applications as well as system-directed applications or daemons, including operating system and driver applications. "Processing systems" include communication and electronic devices, such as mobile phones (cellular or digital), music and multi-media players, and Personal Digital Assistants (PDAs); as well as computers, or "computing devices" of all forms and configurations (desktops, laptops, servers, palmtops, workstations, etc.).

Figure 1:
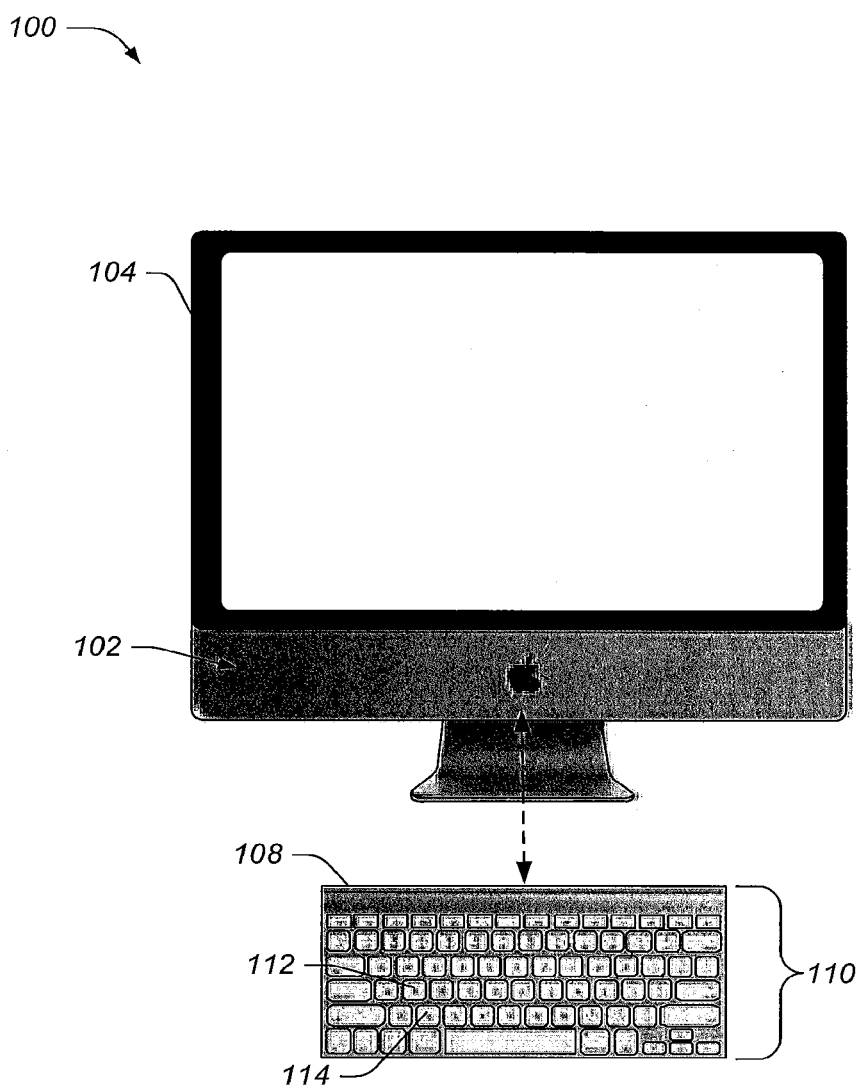
FIG. 1 depicts an example computing system including an input device of a type that can benefit from a haptic feedback system configured to suppress propagating vibrations, in one illustrative operating configuration.

Referring now to FIG. 1, therein is depicted a representation of computing system 100 including an input device in the form of a virtual keyboard 108 with a haptic feedback system configured to suppress propagating vibrations in one common operating configuration. Many configurations of virtual keyboards have been proposed, and will be recognized by those skilled in the art. In this example, virtual keyboard 108 will be discussed in the form of a single unitary surface, such as a glass or metallic plate, having a plurality of contact locations defined thereon, with each such contact location outlined in a conventional keyboard pattern. For purposes of the present description the contact locations of virtual keyboard 108 (the virtual "keys") have been outlined and shaded, but any desired surface appearance may be used for virtual keyboard 108. As will be apparent from the following discussion, the methods and apparatus described are applicable both to much simpler and to more complicated input devices. For example, the input device can be a mouse, a touch screen, a keypad of a mobile communications device, or another type of input interface, etc. Virtual keyboard 108 includes a plurality of contact locations 110 (in this example, each virtual "key" site). Virtual keyboard 108 is configured to detect user inputs, and to communicate those user inputs to computing device 102 through a wired or wireless connection. Contact locations can e any location where a user may be anticipated to contact the input device to interact with it. The detection of a "key" actuation may be performed by any of several mechanisms known in the art, and may be in response either to physical contact with the input surface, or alternatively to proximity of a user to a contact location. Those skilled in the art will recognize that the user input detection system may be of any of the known such systems, including capacitance or inductive sensors, laser sensing, etc. In many embodiments of systems described herein, the haptic feedback system will be entirely separate from the user input detection system. However, the actuators as described herein could also be used as a user input detection mechanism. For example, piezoelectric actuators may be used as sensors to convert physically-induced vibration or displacement into an electrical signal. Thus, such actuators may also be used to detect a user-initiated input.

Figure 4:
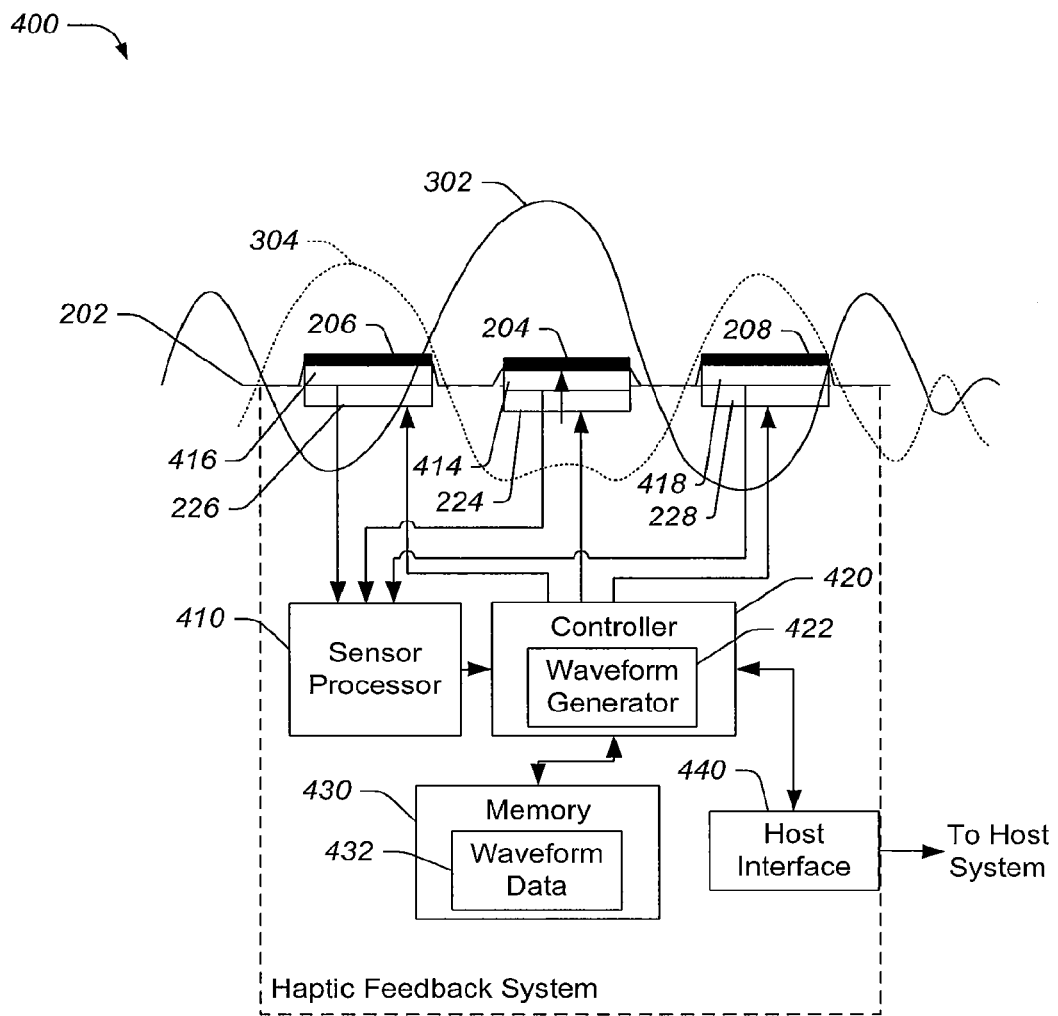
FIG. 4 depicts a haptic feedback system, illustrated in block diagram form, the system configured to suppress propagating waveforms, with the propagating waveform and suppression waveform superimposed over the contact locations.

For purposes of this example, virtual keyboard 108 will be understood to include a haptic feedback system, such as system 400 depicted in FIG. 4, including at least one sensor and at least one actuator positioned on a lower side of the input surface of virtual keyboard 108 (not depicted), proximate a contact location 110. In many examples, actuators will be positioned proximate many, if not all, contact locations 110. The haptic feedback system is configured to drive an actuator beneath a selected contact location, such as contact location 112 using a first waveform configured to provide a desired tactile sensation to a user by inducing mechanical vibrations in the plate under the selected contact location 112.

To suppress propagation of such mechanical vibrations to other contact locations (i.e., vibratory crosstalk), in response to the driving of a feedback actuator in response to a user contact at contact location 112, the haptic feedback system will also drive actuators beneath one or more other contact locations (such as contact location 114) by a suppression waveform that is specifically configured to provide interference with the propagating vibrations, as those propagating vibrations exist at the other contact locations. For clarity of explanation in this disclosure, the suppression waveform configuration will primarily be discussed in the context of a waveform configured to provide destructive interference that will substantially reduce, and potentially cancel, propagating vibrations at these other contact locations. However, the suppression waveforms that may be used are not limited to just cancellation of the propagating vibrations. For example, the suppression waveform may be one that provides interference in terms of amplitude, frequency or both; which masks or otherwise changes the ultimate vibration at these other contact locations, thereby providing a user experience different than just reduction of the propagating vibrations. In the example where the suppression waveform is configured to at least partially cancel vibrations at the other contact locations, one example of a useful suppression waveform is one having an amplitude that is substantially equal to, and 180 degrees out of phase with, the propagating vibrations at the other contact location.

The specific operating parameters of the haptic feedback system will be dependent upon a number of factors, including the material and geometry of the surface through which feedback is being provided. As some general examples, actuators beneath contact locations 110 will be often be configured to produce vibrations having amplitudes within a range from approximately 10 microns to several hundred microns and having frequencies within a range from approximately 40 Hz to 250 Hz. In another example, the frequency range of the actuators ranges from 180 to 220 Hz. In an example where acoustic noise from such haptic feedback is undesirable, the frequency range can be limited to a range that is below 220 Hz, so that the vibrations are relatively inaudible. However, it should be understood that, depending on the implementation, other frequencies and amplitudes may be used. Many types and configurations of actuator may be used for inducing the vibratory inputs to the input surfaces. For example, electromechanic membrane actuators, such as those marketed as the P-25 Planar-mode Haptic Actuator, by Artificial Muscle, Inc. of Sunnyvale, Calif., or those marketed as the BST-5523SA magnetic buzzer by Bosan Hitech may be suitable for many applications, as will a number of other actuators known to those skilled in the art.

The amplitude of the propagating vibrations will vary as the vibrations propagate across an input surface from a selected input location, declining in amplitude in response to greater distance from the initial actuation site. Additionally, vibrations at neighboring locations induced by the identified suppression waveform applied to an actuator there may further introduce secondary vibrations that can also propagate. Accordingly, in some examples, the haptic feedback system will provide different waveforms to the various actuators to suppress propagation of these secondary vibrations also. In applications in which the objective is to at least partially cancel propagating vibrations, the actuator beneath selected contact location 112 will receive a positive waveform and actuators beneath neighboring contact locations (those contact locations having at least one side in common with the selected contact location), such as contact location 114, will receive a negative waveform (i.e., a second waveform that is 180 degrees out of phase with the propagating vibrations originating from an actuator beneath the selected contact location 112). Further, actuators beneath those contact locations directly adjacent to one of the neighboring contact locations (but having no side in common with the selected contact location 112) may be driven with yet another waveform. By tuning the phase of the waveforms and by adjusting the amplitudes appropriately, propagating vibrations will be generally cancelled across input device 108, emphasizing the localized haptic feedback at the selected contact location 112. For purposes of the present description, it is generally considered that a reduction of the amplitude of propagating vibrations by at least 10% at the other contact locations will often sufficiently limit the user's experience of the vibrations at those locations, to achieve "general" reduction of the propagating vibrations, as described herein.

In many cases, the actuators proximate a non-selected contact location will be used to generally suppress or otherwise obscure vibrations at that non-selected contact location. However, it must be understood that because the vibrations travel through the surface, the actuator at a non-selected location may also be actuated to suppress propagating vibrations at a third contact location. By way of example, if an actuator is driven to provide feedback at a first ("selected") contact location, a second actuator at a second contact location might be driven to suppress the propagating vibrations at a third contact location. A simple example of this is that the second actuator might be driven to suppress propagating vibrations at a central contact location midway between the first and second (driven) contact locations.

Figure 2:
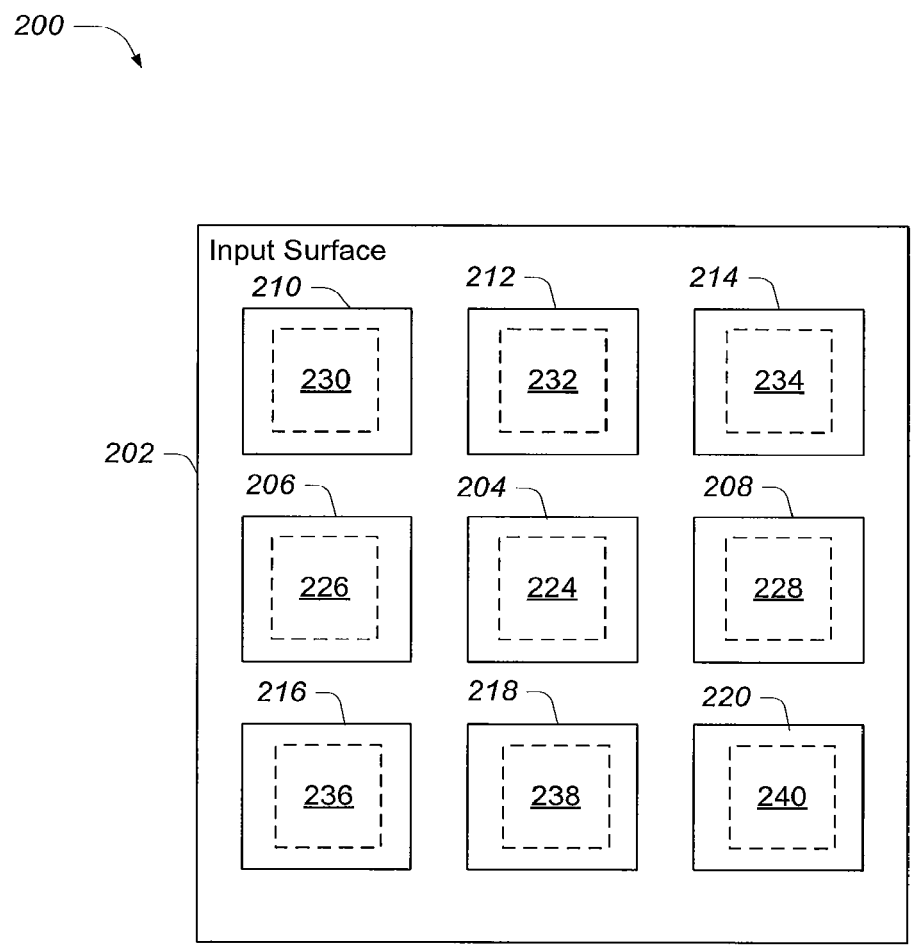
FIG. 2 depicts a generic single surface input device, depicted in block diagram form, as may benefit from a haptic feedback system configured to suppress vibratory crosstalk.

FIG. 2 depicts a representation of input device 200, illustrated in block diagram form, including a haptic feedback system to suppress vibratory crosstalk. In an example, input device 200 is again a generally flat surface, such as a touch screen keypad of a mobile telephone, a portion of a keyboard (such as virtual keyboard 108 in FIG. 1) or another configuration of an input device where haptic crosstalk impairs the user experience of using the input device.

Input device 200 includes a plurality of contact locations defined on a generally continuous surface 202 in a common application for the presently disclosed methods and apparatus. A number of contact locations 204, 206, 208, 210, 212, 214, 216, 218, and 220 are defined on surface 202, and in this example, each contact location has an associated actuator 224, 226, 228, 230, 232, 234, 236, 238, and 240, respectively, on the underside of surface 202.

As will be apparent from the prior discussion, a user input at contact location 204 (however detected), causes the haptic feedback system to induce a vibration at contact location 204 by driving actuator 224 located directly beneath the contact location 204. In this example, the propagating vibrations at the neighboring contact locations 206, 208, 210, 212, 214, 216, 218 and 220 may be suppressed by driving associated actuators 226, 228, 230, 232, 234, 236, 238 and 240 using waveforms configured to cancel the propagating vibrations. As used herein, the term "adjacent" or "neighboring" refers to two contact locations between which there is no intervening contact location.

As noted above, propagating vibrations will typically be different at different contact locations. In many instances, the input surface attenuates vibrations, such that both amplitude and phase of propagating vibrations vary in response to the distance from the actuator that originated the vibrations. For example, different materials attenuate vibrations differently, such that particular canceling waveforms may vary based on implementation-specific features or configurations of a system. Additionally, dampening mechanisms at mounting points may minimize or effectively eliminate reflected vibrations in the surface. Further, in some instances, intervening contact locations may attenuate propagating vibrations in different ways, depending on the respective positions and orientations. For example, actuators beneath some contact locations may provide a damping effect on propagating vibrations, even if not actuated. Thus, as identified above, in some examples different waveforms will be applied to suppress propagating vibrations (vibratory crosstalk) at different contact locations, depending on which contact location is selected and based on the proximity of the particular contact location to the selected contact location.

Figure 3:
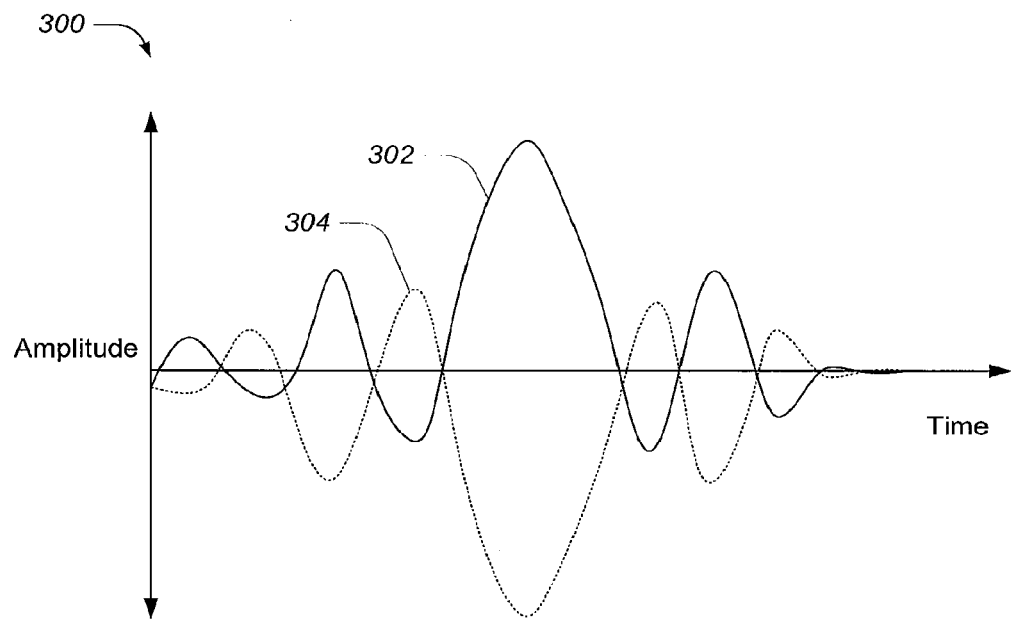
FIG. 3 depicts a graph of waveform amplitude versus input location for a feedback vibration provided at a selected input location and a vibratory crosstalk suppressing waveform provided to an adjacent input location for the generic input device of FIG. 2.

Referring now to FIG. 3, therein is depicted a graph 300 of waveform amplitude versus time for propagated vibration 302 as provided at a selected input location (such as a location corresponding to contact location 204 depicted in FIG. 2), but depicted after it has traversed the surface to an adjacent contact location. Also depicted is a vibratory crosstalk suppressing waveform 304 provided to that adjacent input location (such as locations corresponding to contact locations 206 and 208 depicted in FIG. 2), the suppression waveform configured to at least partially cancel the propagating vibration. In this particular example, when contact location 204 is pressed, an actuator under contact location 204 is driven by a positive signal waveform 302 appropriately chosen to provide a desired tactile sensation by inducing mechanical vibrations directly beneath contact location 204. To suppress the propagating vibrations, actuators under neighboring contact locations 206 and 208 will be driven by a complimentary ("negative") waveform configured to produce vibrations of equal amplitude but opposite phase from the propagating vibrations originally generated by actuator 224 beneath contact location 204, thereby suppressing the propagating vibrations at contact locations 206 and 208. By controlling the complimentary waveform, haptic feedback may be localized to selected contact locations.

FIG. 4 depicts a representation of a haptic feedback system 400, illustrated in block diagram form, configured to suppress propagating waveforms, with the propagating waveform 302 and suppression waveform 304 superimposed over input contact locations 204, 206, and 208. System 400 includes touch-sensitive sensors 414, 416, and 418 beneath contact locations 204, 206, and 208, respectively, to detect contact with the contact locations 204, 206, and 208. Haptic feedback system 400 includes sensor processor 410 coupled to sensors 414, 416, and 418 to receive signals related to user selection of a contact location and to provide a "input" signal for that location to controller 420. Controller 420 is coupled to a host system through a host interface 440 to communicate user input data related to the input signal. Further, controller 420 is coupled to actuators 224, 226, and 228 associated with contact locations 204, 206, and 208, respectively, which actuators 224, 226, and 228 are responsive to actuator drive signals (waveforms) from controller 420 to produce tactile vibrations that may be felt by a user through one of contact locations 204, 206, and 208. Controller 420 includes waveform generator 422, configured to dynamically produce waveforms appropriate to provide tactile vibrations at a selected contact location, such as contact location 204. In this example, the waveform generator 422 is configured to receive sensed data from the sensors 416 and 418 and to generate suppression waveforms to activate the actuators 226 and 228 to suppress propagating vibrations at contact locations 206 and 208.

In an alternative example, rather then generate suppression waveforms in response to sensed data, suppression waveforms will be previously established and stored in memory 430. In this example, waveform data 432 may be accumulated during actual operation or during a calibration operation by storing data from sensors 414, 416, and 418 when an actuator is activated. In this instance, the waveform data 432 can include vibration data for some or all other contact locations relative to vibrations generated by actuators beneath each other contact location. Having the benefit of this data, appropriate suppression waveforms can be pre-generated and stored in the memory. In this instance, waveform generator 422 will access memory 430 to retrieve waveform data 432 and to either generate a suppression waveform from the waveform data, or to merely use pre-generated suppression waveform to drive the appropriate actuators. For implementations where substantial consistency of vibration propagation is seen across multiple individual devices, then the calibration waveform data need not be generated on the specific device in question, but may be generated based upon one or more sample devices and used for programming of other similarly-configured devices.

In this example, contact location 204 is selected by a user (by contact or proximity) and sensor 214 provides a signal to sensor processor 410. Sensor processor 410 then provides an "input" signal related to the selection at contact location 204 to controller 420. In response to receiving the input signal, controller 420 will provide data related to the selection to the host system via host interface 440 and will provide a waveform to actuator 224 to produce a tactile vibration beneath contact location 204. Additionally, preferably in response to that same input signal, controller 420 will drive actuators 226 and 228 with a suppression waveform to induce vibration at actuators 226 and 228 to suppress, by in some way altering, propagating vibrations at contact locations 206 and 208. As previously identified, although the primary illustrative example has been the suppression of crosstalk signals by at least partially canceling them, it should be remembered that an alternative objective may be to induce suppression vibrations which merely interfere or with or otherwise alter the perceivable vibrations at contact locations other than the one of actuation to alter the user experience in ways other than canceling vibrations. For example, a suppression waveform might be generated which serves to partially cancel crosstalk signals but which also induces a higher frequency signal to establish a different tactile sensation for a user other than just that of minimized vibration. All such variations that effectively change the surface vibrations that propagate as a result of the haptic feedback signal are considered to represent "suppression" within the context of the present disclosure.

As one example of a calibration process as identified above, contact may be made with each of the contact locations, one at a time, and sensors at those locations may be used to provide signals related to such contacts to sensor processor 410, which communicates the sensed data to controller 420. Controller 420 activates the actuator associated with the pressed contact location. In this instance, the sensors associated with other contact locations measure the propagating vibrations and provide data related to the propagating vibrations to sensor processor 410, which communicates the data to the controller 420 for storing related waveform data 432 in memory 430. In an example, controller 420 applies suppression waveforms to neighboring actuators during subsequent iterations, and the calibration process is repeated iteratively, adjusting stored waveform data 432 at each iteration, until a desired suppression at each contact location is achieved. In this way, the propagating effects of both the original feedback waveform, and also of other suppression waveforms, may be considered in configuring each suppression waveform.

It should be understood that haptic feedback system 400 is one representative implementation configured to suppress propagating vibrations; however, other implementations are possible. For example, in another embodiment, sensor processor and controller can be combined. In still another embodiment, the host system can provide sensor processing and waveform generation. In an example, sensors 414, 416, and 418 are combined with actuators 224, 226, and 228, respectively. Further, in an example, waveform data 432 can be stored in a single table or multiple tables, in a database, or in any appropriate form. Further, though the above-discussion has focused on selection of a single contact location, such as contact location 204, the waveform data 432 may include data related to multiple simultaneous contact location selections in a multi-input implementation.

Figure 5:
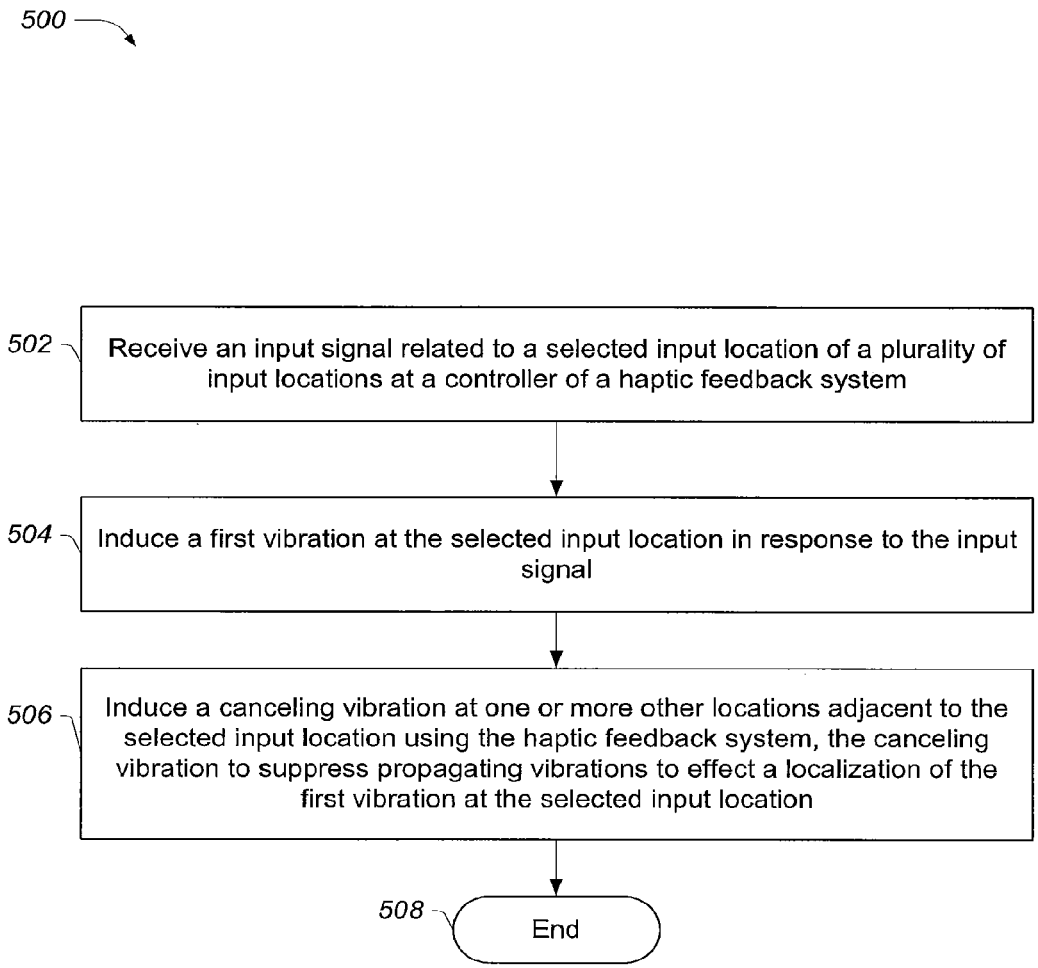
FIG. 5 depicts a flow diagram of an example embodiment of a method of providing localized haptic feedback while suppressing vibratory crosstalk using a haptic feedback system.

Referring now to FIG. 5, therein is depicted a flow diagram 500 of a particular illustrative embodiment of a method of providing localized haptic feedback while suppressing vibratory crosstalk using a haptic feedback system. At 502, an input is received that is related to a selected contact location of a plurality of contact locations at a controller of a haptic feedback system. In an example, a selection signal is received from a sensor, from a sensor processor, and/or from a selected contact location. Advancing to 504, a first vibration is induced at the selected contact by selectively activating one or more actuators associated with the selected contact location to generate vibrations providing haptic feedback to a user.

Moving to 506, a suppression vibration is induced at one or more other contact locations, including, in some examples, contact locations adjacent to the selected input location; the suppression vibration is configured to suppress propagating vibrations from the first vibration to effect a localization of the first vibration at the selected contact location. In an example, the propagating vibrations include a first waveform having a first amplitude and phase, and the canceling vibration includes a second waveform having the first amplitude and having a second phase configured to suppress the propagating vibrations. In the example of waveform cancellation, the suppression waveform will preferably be generated from the same contact signal as generated the user feedback signal, and will be of opposite phase from the original, but will also be adjusted in both time and amplitude to offset the crosstalk signal as delayed and attenuated by travel through the input surface. In other examples, the canceling vibrations are induced by retrieving waveform data from a memory associated with the haptic feedback system and either generating at least one waveform based on the retrieved waveform data to induce the canceling vibration, or using data representative of a stored suppression waveform. As noted previously, where the suppression waveforms are based on previously performed calibrations, the suppression waveforms may have been iteratively refined to account even for other suppression waveforms, and may thus be far more complex than the out of phase, amplitude adjusted signals used to provide a clear disclosure of the principles herein. The generation of those relatively complex suppression waveforms is considered to be within the level of those skilled in the art, having the benefit of the present disclosure. In another example, the canceling waveforms are produced dynamically based on sensed data. The method terminates at 508.

It should be understood that the flow diagram 500 depicted in FIG. 5 is an illustrative example of a particular embodiment, and is not intended to be limiting. Further, it should be understood that other steps may be added and/or steps may be combined without departing from the spirit and scope of this disclosure. For example, in a particular implementation, elements 504 and 506 may be combined. In other implementations, a delay may be introduced between elements 504 and 506 to allow time for propagation of the vibrations before the canceling waveform is applied.

In conjunction with the systems and methods described above and depicted with respect to FIGS. 1-5, an input device is disclosed that includes a haptic feedback system to provide localized tactile feedback at a selected input location while suppressing vibratory crosstalk (propagating vibrations) at other input locations. In an example, a controller is adapted to selectively activate one or more actuators of an array of actuators using a first waveform to produce a vibration at a selected input location and to activate other actuators using one or more second waveforms to produce canceling vibrations to suppress propagation of vibrations at other input locations. The haptic feedback systems and methods disclosed with respect to FIGS. 1-5 above can be used with any multi-input interface and is not limited to keyboards, keypads, or touch screen interfaces. For example, the haptic feedback system can be used in connection with a multi-touch track pad. Additionally, the described techniques may be used with additional sensor signals, or measurements derived from such signals to refine detection of events creating data extraneous to the movement and other positioning information. Many additional modifications and variations may be made in the techniques and structures described and illustrated herein without departing from the spirit and scope of the present invention.

We claim:

1. A controller in communication with an actuator of a haptic feedback system, the controller comprising:
   a waveform generator in communication with the actuator and configured to:
      apply an activation waveform to the actuator to produce a haptic output;
      generate a suppression waveform based at least in part on vibrations propagating along or through a surface to which the actuator is coupled; and
      apply the suppression waveform to the actuator to dampen the vibrations propagating along or through the surface.

2. The controller of claim 1, wherein the controller is coupled to a sensor configured to detect a user touch on the surface.

3. The controller of claim 2, wherein the controller is configured to apply the activation waveform in response to the user touch.

4. The controller of claim 1, wherein the activation waveform is selected at least in part on an acoustic characteristic.

5. The controller of claim 4, wherein the acoustic characteristic comprises an acoustic output.

6. The controller of claim 5, wherein the acoustic output comprises audible sound.

7. The controller of claim 1, wherein the suppression waveform comprises an amplitude that is opposite the amplitude of the activation waveform.

8. The controller of claim 1, wherein the waveform generator is configured to select the activation waveform from a plurality of activation waveforms stored in a non-transitory storage medium.

9. A controller in communication with a plurality of electromechanical actuators each coupled to an input surface of a haptic feedback system, the controller comprising:
   a waveform generator in communication with each actuator of the plurality of actuators and configured to:
      apply an activation waveform to a first actuator of the plurality of actuators to produce a haptic output at a first location of the input surface; and
      apply a suppression waveform to a subset of actuators in the plurality of actuators to dampen vibrations propagating along or through the input surface as a result of the activation waveform.

10. The controller of claim 9, wherein the controller is coupled to a sensor configured to detect the location of a user touch on the input surface.

11. The controller of claim 10, further configured to apply the activation waveform at the first location in response to the user touch.

12. The controller of claim 9, wherein the activation waveform is selected at least in part on an acoustic characteristic.

13. The controller of claim 12, wherein the acoustic characteristic comprises an acoustic output.

14. The controller of claim 13, wherein the acoustic output comprises audible sound.

15. The controller of claim 9, wherein the input surface comprises at least a portion of one of the group consisting of a keyboard, a mouse, a track-pad, and a touch screen.

16. A method of controlling an actuator of a haptic feedback system, the method comprising:
   applying an activation waveform to the actuator to produce a haptic output; and
   applying a suppression waveform to the actuator to dampen vibrations resulting from the activation waveform propagating along or through an input surface to which the actuator is coupled.

17. The method of claim 16, further comprising detecting by a sensor a user touch of the input surface.

18. The method of claim 16, wherein the activation waveform is selected at least in part on an acoustic characteristic.

19. The method of claim 18, wherein the acoustic characteristic comprises an acoustic output.

20. The method of claim 19, wherein the acoustic output comprises audible sound.

* * * * *